(12) United States Patent
Issaev et al.

(10) Patent No.: US 7,858,230 B2
(45) Date of Patent: Dec. 28, 2010

(54) BATTERY CATHODES

(75) Inventors: Nikolai N. Issaev, Woodbridge, CT (US); Michael Pozin, Brookfield, CT (US)

(73) Assignee: The Gillette Company, Boston, MA (US)

( * ) Notice: Subject to any disclaimer, the term of this patent is extended or adjusted under 35 U.S.C. 154(b) by 1002 days.

(21) Appl. No.: 11/259,527

(22) Filed: Oct. 26, 2005

(65) Prior Publication Data

US 2007/0089289 A1    Apr. 26, 2007

(51) Int. Cl.
H01M 4/00 (2006.01)
H01M 4/02 (2006.01)
H01M 4/60 (2006.01)
H01M 4/62 (2006.01)

(52) U.S. Cl. .................. 429/209; 429/122; 429/212; 429/217

(58) Field of Classification Search .................. None
See application file for complete search history.

(56) References Cited

U.S. PATENT DOCUMENTS

| 345,124 | A |  | 7/1886 | DeVirloy et al. |
| 4,279,972 | A |  | 7/1981 | Moses |
| 4,401,735 | A |  | 8/1983 | Moses et al. |
| 4,526,846 | A |  | 7/1985 | Kearney et al. |
| 5,308,714 | A | * | 5/1994 | Crespi .................. 429/59 |
| 5,595,841 | A |  | 1/1997 | Suzuki |
| 6,841,302 | B2 |  | 1/2005 | Anglin et al. |
| 2001/0031311 | A1 |  | 10/2001 | Lee et al. |
| 2002/0160251 | A1 | * | 10/2002 | Chang et al. .................. 429/42 |
| 2004/0091773 | A1 | * | 5/2004 | Boczer et al. ............... 429/217 |
| 2005/0112467 | A1 |  | 5/2005 | Berkowitz et al. |
| 2005/0164085 | A1 |  | 7/2005 | Bofinger et al. |
| 2005/0164086 | A1 |  | 7/2005 | Bofinger et al. |
| 2005/0202320 | A1 |  | 9/2005 | Totir et al. |

FOREIGN PATENT DOCUMENTS

| EP | 0 763 865 A1 | 3/1997 |
| EP | 0 155 705 A2 | 7/2005 |
| WO | WO 99/60638 | 11/1999 |
| WO | WO 00/67337 | 11/2000 |

OTHER PUBLICATIONS

Duracell Lithium/Manganese Dioxide, 4 Construction (1 page), Retrieved from the Internet prior to the filing of the application, Sep. 2006.

Falk, S. et al., "Alkaline Storage Batteries", John Wiley & Sons, Inc., 1969, pp. 1-41.

(Continued)

*Primary Examiner*—Dah-Wei D Yuan
*Assistant Examiner*—Steven Scully
(74) *Attorney, Agent, or Firm*—Fish & Richardson P.C.

(57) ABSTRACT

Batteries and related compositions and methods are disclosed. In some embodiments, a method of making a battery can include heating at least one cathode including a cathode material in an atmosphere including oxygen, heating the cathode in a vacuum, adding the cathode into a housing, adding a separator into the housing, and adding an anode into the housing.

18 Claims, 2 Drawing Sheets

OTHER PUBLICATIONS

Kraton Polymers, Kraton® G-1651 polymer, Data Document, Jun. 2003 (2 pages).
Linden, D., *Handbook of Batteries*, McGraw-Hill, Inc., 1995, "1.4 Classification of Cells and Batteries", pp. 1.9-1.11; "7.1 General Characteristics and Applications of Primary Batteries", pp. 7.3-7.7; "23.1 General Characteristics and Applications of Secondary Batteries", pp. 23.3-23.12.
Berkowitz et al., U.S. Appl. No. 10/675,512, filed Sep. 30, 2003.
Bowden et al., U.S. Appl. No. 11/096,514, filed Apr. 1, 2005.

* cited by examiner

BATTERY CATHODES

TECHNICAL FIELD

The invention relates to batteries, as well as to related compositions and methods.

BACKGROUND

Batteries or electrochemical cells are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

SUMMARY

The invention relates to batteries, as well as to related compositions and methods.

In one aspect, the invention features a method of making a battery, such as a primary battery (e.g., a coin cell). The method includes heating at least one cathode (e.g., a plurality of cathodes) including a cathode material in an atmosphere that includes oxygen, heating the cathode in a vacuum, adding the cathode into a housing, adding a separator into the housing, and adding an anode into the housing.

In another aspect, the invention features a method of making a battery, such as a primary battery (e.g., a coin cell). The method includes heating at least one cathode (e.g., a plurality of cathodes) including a cathode material in an atmosphere that includes nitrogen dioxide, sulfur dioxide, and/or ozone, heating the cathode in a vacuum, adding the cathode into a housing, adding a separator into the housing, and adding an anode into the housing.

In an additional aspect, the invention features a cathode including a substrate and a cathode material that is supported by the substrate and that includes manganese dioxide. The cathode material includes about 600 ppm of water or less and about 0.1 percent by weight $Mn_3O_4$ or less (e.g., 0.05 percent by weight $Mn_3O_4$ or less).

In a further aspect, the invention features a cathode including a substrate and a cathode material that is supported by the substrate. The cathode material includes about 600 ppm of water or less and has an X-ray diffraction pattern that is free of any peaks at about 18 degrees 2θ, and/or 32.35 degrees 2θ, and/or 36.15 degrees 2θ.

Embodiments can include one or more of the following features.

The atmosphere can include oxygen at a partial pressure of from about 0.1 inch Hg (2.54 Torr) to about 10 inches Hg (254 Torr) (e.g., from about 0.5 inch Hg (12.7 Torr) to about 10 inches Hg (254 Torr)). In some embodiments, the atmosphere can include oxygen at a partial pressure of from about 0.3 inch Hg (7.6 Torr) to about 0.5 inch Hg (12.7 Torr).

The cathode can be heated in a vacuum after the cathode has been heated in an atmosphere that includes oxygen. Heating a cathode in a vacuum can include heating the cathode until the cathode material includes about 600 ppm of water or less (e.g., about 400 ppm of water or less). In certain embodiments, heating a cathode in a vacuum can include heating the cathode until the cathode material includes from about 400 ppm to about 600 ppm of water.

Heating a cathode in a vacuum or in an atmosphere that includes oxygen can include heating the cathode for at least about four hours (e.g., from about two hours to about 75 hours, from about four hours to about 50 hours, from about four hours to about 20 hours, about 10 hours), and/or at a temperature of at least about 160° C. (e.g., from about 160° C. to about 240° C., from about 180° C. to about 220° C., about 200° C.). Heating a cathode in an atmosphere that includes oxygen can include heating the cathode until the cathode material has a differential scanning calorimetry peak at from about 240° C. to about 310° C. (e.g., from about 290° C. to about 300° C., about 290° C.) with a height of about 30 Joules/gram or less (e.g., from about five Joules/gram to about 30 Joules/gram, from about 18 Joules/gram to about 30 Joules/gram). In some embodiments, the cathode material can additionally have an X-ray diffraction pattern that is free of any peaks at about 18 degrees 2θ, and/or 32.35 degrees 2θ, and/or 36.15 degrees 2θ. In certain embodiments, after the cathode has been heated in a vacuum, the cathode material includes less than about 0.1 percent by weight $Mn_3O_4$.

The cathode material can include a manganese oxide (e.g., manganese dioxide), nickel oxyhydroxide, carbon monofluoride, vanadium pentoxide, or iron disulfide. In some embodiments, the cathode material can include a binder. In certain embodiments, the binder can include a polymer, such as a copolymer (e.g., a block copolymer). In some embodiments, the binder can include a binder including a styrene block. For example, the binder may include a styrenic block copolymer (e.g., styrene-ethylene/butylene-styrene (SEBS)). In certain embodiments, the binder can include polyvinyl alcohol and/or polyvinylidene fluoride. The cathode can be substantially free of $Mn_3O_4$. The cathode material can be substantially free of $Mn_3O_4$. In some embodiments, the cathode material can be coated on the substrate.

The anode can include lithium and/or an alloy including lithium.

The atmosphere can further include an inert gas (e.g., helium, neon, argon, krypton, xenon, radon) and/or nitrogen. The inert gas and/or nitrogen can be mixed with oxygen and/or air. The oxygen in the atmosphere can be at a partial pressure of from about 0.1 inch Hg (2.54 Torr) to about 10 inches Hg (254 Torr). The air in the atmosphere can be at a residual pressure of from about 0.5 inch Hg (12.7 Torr) to about 29.92 inches Hg (759.97 Torr).

The method can include adding an electrolyte into the housing and/or sealing the housing (e.g., using a cap and an annular insulating gasket).

Embodiments can include one or more of the following advantages.

In some embodiments, a battery that includes the cathode can exhibit a relatively low rate of gassing (e.g., $CO_2$ gassing). In certain embodiments, a battery that includes the cathode can be less likely to leak (e.g., as a result of gas build-up) than a comparable battery that does not include the cathode, such as a comparable battery including a cathode that has not been heat-treated. In some embodiments, a battery that includes the cathode may be operated without a pre-discharge step to control gassing. In some such embodiments, the battery may have a relatively high cell capacity and/or may be easier to manufacture than a battery that is operated with a pre-discharge step.

DETAILED DESCRIPTION

Figure 1:
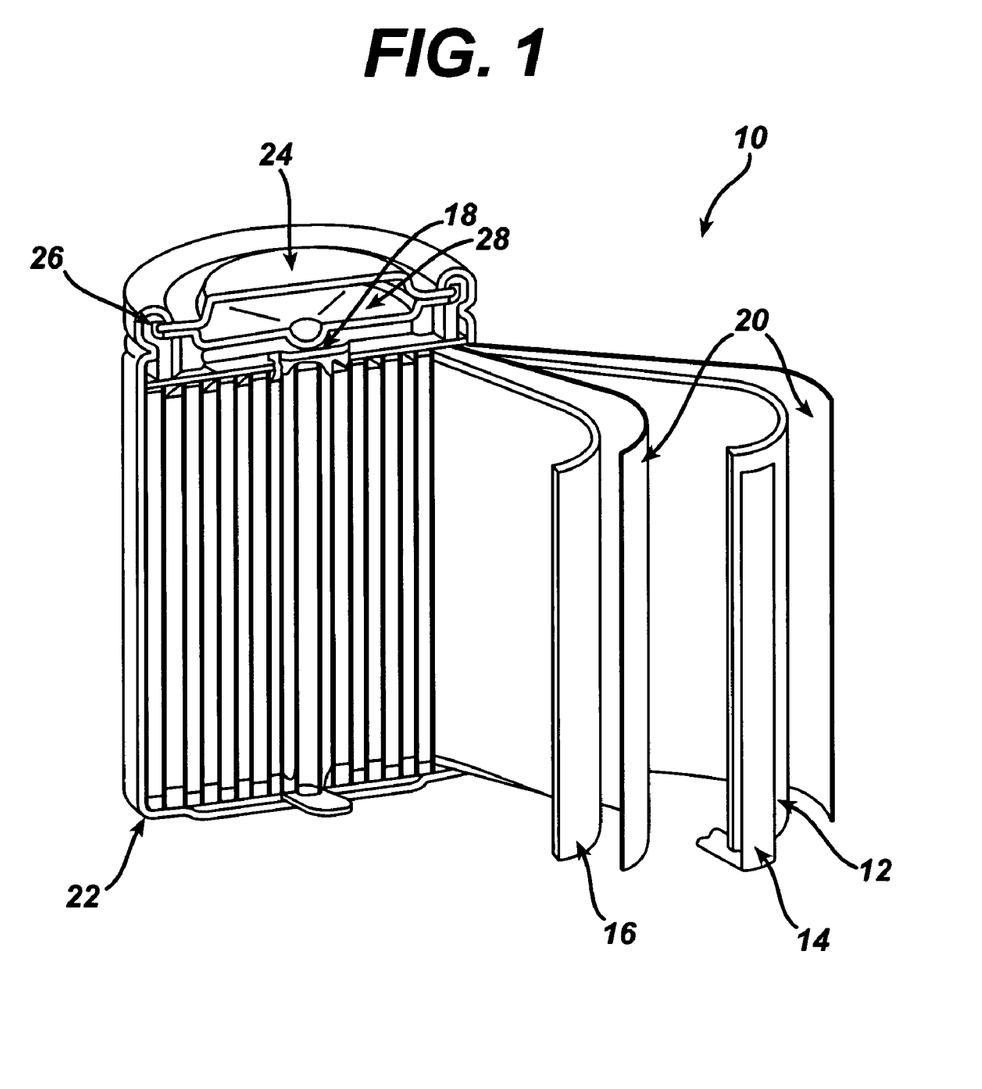
FIG. 1 is a sectional view of a nonaqueous electrochemical cell.

Referring to FIG. 1, a primary electrochemical cell 10 includes an anode 12 in electrical contact with a negative lead 14, a cathode 16 in electrical contact with a positive lead 18, a separator 20 and an electrolytic solution. Anode 12, cathode 16, separator 20 and the electrolytic solution are contained within a housing 22. The electrolytic solution includes a solvent system and a salt that is at least partially dissolved in the solvent system. Electrochemical cell 10 further includes a cap 24 and an annular insulating gasket 26, as well as a safety valve 28. Positive lead 18 connects cathode 16 to cap 24. Safety valve 28 is disposed in the inner side of cap 24 and is configured to decrease the pressure within electrochemical cell 10 when the pressure exceeds some predetermined value.

Cathode 16 includes a cathode material that is coated onto a current collector. The cathode material includes at least one (e.g., two, three) cathode active material. The cathode active material can be, for example, a metal oxide, such as a manganese oxide. In some embodiments, the cathode active material can be manganese dioxide ($MnO_2$), such as EMD, CMD, gamma-$MnO_2$, or a combination (e.g., a blend) of any of these materials. Distributors of manganese dioxides include Kerr-McGee Corp. (manufacturer of, e.g., Trona D and high-power EMD), Tosoh Corp., Delta Manganese, Delta EMD Ltd., Mitsui Chemicals, ERACHEM, and JMC. Gamma-$MnO_2$ is described, for example, in "Structural Relationships Between the Manganese (IV) Oxides", Manganese Dioxide Symposium, 1, The Electrochemical Society, Cleveland, 1975, pp. 306-327, which is incorporated herein by reference in its entirety. In certain embodiments, the cathode active material can be another type of manganese oxide composition. For example, the cathode active material can be HEMD, or can be a lithium manganese oxide composition, such as lithiated $MnO_2$, or LiMD. In some embodiments, the cathode active material can be a lithium manganese oxide composition that is formed by the lithiation of $MnO_2$ and subsequent heat treatment of the lithiated $MnO_2$ in an oxygen atmosphere. In certain embodiments, the cathode active material can be $MnO_2$ that includes from about 0.1 percent to about two percent lithium by weight. Manganese oxide compositions are described, for example, in Bofinger et al., U.S. Patent Application Publication No. US 2005/0164085 A1, published on Jul. 28, 2005, and in Bofinger et al, U.S. Patent Application Publication No. US 2005/0164086 A1, published on Jul. 28, 2005, both of which are incorporated herein by reference.

In addition to including a cathode active material, the cathode material of cathode 16 can further include one or more binders, such as a polymeric binder. Examples of polymeric binders include copolymers, such as block copolymers (e.g., block copolymers including styrene blocks). For example, the cathode material may include one or more styrenic block copolymers (e.g., styrene-ethylene/butylene-styrene (e.g., Kraton™ G-1651 Polymer). Other examples of polymeric binders include polytetrafluoroethylene (PTFE), polyvinylidene fluoride (PVDF), polyvinyl alcohol, and Vitono® (e.g., a copolymer of vinylidene difluoride and hexafluoropropylene).

In some embodiments, the cathode material of cathode 16 can include a carbon source, such as, for example, carbon black, synthetic graphite including expanded graphite or non-synthetic graphite including natural graphite, an acetylenic mesophase carbon, coke, graphitized carbon nanofibers or a polyacetylenic semiconductor.

As noted above, cathode 16 includes a current collector on which the cathode material can be coated or otherwise deposited. The current collector can have a region in contact with positive lead 18 and a second region in contact with the cathode material. The current collector serves to conduct electricity between positive lead 18 and the cathode material. The current collector can be made of a material that is strong and is a good electrical conductor (has a low resistivity). Examples of such materials include metals (e.g., titanium, aluminum, nickel) and metal alloys (e.g., stainless steel, an aluminum alloy). In some embodiments, the current collector can take the form of an expanded metal screen or grid. Grids of stainless steel, aluminum, or aluminum alloys are available from Exmet Corporation (Branford, Conn.).

In certain embodiments, the cathode material of cathode 16 can include a relatively small amount of water. In some embodiments, the cathode material can include about 600 ppm of water or less (e.g., about 500 ppm of water or less, about 400 ppm of water or less, about 300 ppm of water or less, about 200 ppm of water or less, about 100 ppm of water or less, about 50 ppm of water or less, about 25 ppm of water or less), and/or about 10 ppm of water or more (e.g., about 25 ppm of water or more, about 50 ppm of water or more, about 100 ppm of water or more, about 200 ppm of water or more, about 300 ppm of water or more, about 400 ppm of water or more, about 500 ppm of water or more). For example, the cathode material can include from about 400 ppm to about 600 ppm of water. As used herein, the water content of cathode 16 is determined experimentally using standard Karl Fischer titrimetry. For example, moisture detection can be performed using a Mitsubishi moisture analyzer (such as CA-05 or CA-06) with a pyrolizing unit (VA-05 or VA-21) set at 110-115° C.

In certain embodiments, as the water content of the cathode material decreases, the extent of gassing by cathode 16 can also decrease. For example, it is believed that water in cathode 16 can be involved (e.g., as a catalyst) in a reaction of one or more solvents in the electrolytic solution that produces carbon dioxide gas, and that lowering the amount of water in cathode 16 can therefore result in decreased production of carbon dioxide gas. In some embodiments, cathode 16 can have a gassing rate of less than about 60 cubic centimeters (e.g., less than about 50 cubic centimeters, less than about 40 cubic centimeters, less than about 30 cubic centimeters, less than about 20 cubic centimeters) and/or more than about 15 cubic centimeters (e.g., more than about 20 cubic centimeters, more than about 30 cubic centimeters, more than about 40 cubic centimeters, more than about 50 cubic centimeters) of gas over four weeks at 60° C.

An in-cell gas test can be used to determine the $CO_2$ gassing rate of cathode 16. In an in-cell gas test, 1.8 grams of electrolyte and 6.5 grams of cathode 16 (which includes an expanded stainless steel grid) are added into an uncrimped ⅔ A cell. The electrolyte is 0.65 M lithium trifluoromethanesulfonate (LiTFS) dissolved in a solvent that includes 20 percent by weight propylene carbonate, ten percent by weight ethylene carbonate, and 70 percent by weight dimethoxyethane. Approximately 0.5 gram of lithium metal, a separator including two strips of microporous polypropylene, and top and bottom insulators are also added into the cell. After all components have been added into the cell, a cap is placed on the cell, and the cell is pre-discharged by about six percent to about eight percent. The cell is then sealed in an aluminized Mylar bag and stored at 60° C. Gas evolution is determined by displacement and weight under water.

In certain embodiments, the cathode material of cathode 16 can include a relatively small amount of $Mn_3O_4$. Without wishing to be bound by theory, it is believed that as the amount of $Mn_3O_4$ in the cathode material decreases, the electrochemical performance of cathode 16 can be enhanced. For example, it is believed that $Mn_3O_4$ is not as electrochemically active as $MnO_2$ (and that $Mn_3O_4$ can be essentially electrochemically inactive), and that a cathode that includes $Mn_3O_4$ can have a lower capacity than a comparable cathode that includes $MnO_2$. In some embodiments, the cathode material of cathode 16 can include at most about 0.5 percent by weight (e.g., at most about 0.4 percent by weight, at most about 0.3 percent by weight, at most about 0.2 percent by weight, at most about 0.1 percent by weight) $Mn_3O_4$. In certain embodiments, the cathode material can include less than about 0.1 percent by weight $Mn_3O_4$, such that the cathode material is substantially free of $Mn_3O_4$.

X-ray diffraction analysis can be used to determine whether the cathode material of cathode 16 includes $Mn_3O_4$. Without wishing to be bound by theory, it is believed that X-ray diffraction peaks at about 18 degrees 2θ, 32.35 degrees 2θ, and 36.15 degrees 2θ are indicative of the presence of $Mn_3O_4$ in the cathode material. In some embodiments, the X-ray diffraction pattern of the cathode material can be free of any peaks at about 18 degrees 2θ, and/or any peaks at 32.35 degrees 2θ, and/or any peaks at 36.15 degrees 2θ.

In certain embodiments, cathode 16 can have a relatively high capacity. In some embodiments, cathode 16 can have a capacity of about 150 mAh/gram or more (e.g., about 195 mAh/gram or more, about 215 mAh/gram or more, about 250 mAh/gram or more, about 280 mAh/gram or more, about 300 mAh/gram or more), and/or about 308 mAh/gram or less (e.g., about 300 mAh/gram or less, about 280 mAh/gram or less, about 250 mAh/gram or less, about 215 mAh/gram or less, about 195 mAh/gram or less). In certain embodiments (e.g., in certain embodiments in which cell 10 is discharged under a relatively small load, such as about 100 Ohms or more), cathode 16 can have a capacity of from about 250 mAh/gram to about 308 mAh/gram. In some embodiments (e.g., in some embodiments in which cell 10 is discharged at a relatively high current, such as about five Watts or more), cathode 16 can have a capacity of from about 150 mAh/gram to about 280 mAh/gram.

A cathode can be made, for example, by coating a cathode material onto a current collector, and drying and then calendering the coated current collector. The cathode material can be prepared by mixing the cathode active material together with other components, such as a binder, solvent/water, and a carbon source. For example, a cathode active material such as $MnO_2$ may be combined with carbon (e.g., graphite, acetylene black), and mixed with small amount of water and/or one or more other solvents (e.g., toluene, ethyl benzene, octane, cyclohexane, Shellsol A100 (from Shell Chemicals)) to form a cathode material slurry. A current collector can then be coated with the cathode material slurry to form the cathode.

In some embodiments, a cathode such as cathode 16 can be formed by preparing a cathode material slurry, coating a current collector with the cathode material slurry to form cathode 16, and then heat treating and vacuum baking cathode 16.

In certain embodiments, after being formed, cathode 16 can first be heat treated in an atmosphere including oxygen and/or one or more other oxidizing gases (e.g., $NO_2$, $SO_2$, ozone) at a relatively low partial pressure. Cathode 16 can be heated using, for example, a box furnace. In some embodiments, the oxygen in the heat treatment atmosphere can oxidize residual aromatic compounds (e.g., toluene, ethyl benzene) and/or other hydrocarbons (e.g., octane, cyclohexane) that may be present in the cathode material slurry. In certain embodiments, the residual aromatic compounds can be residual components of a solvent (e.g., Shellsol A100, from Shell Chemicals) used in the preparation of the cathode material slurry. Examples of solvents that can be used in the preparation of the cathode material slurry include the electrolyte solvents described below.

Oxidation of residual aromatic compounds during heat treatment of the cathode material slurry can lead to a decrease in the extent of reaction between residual aromatic compounds and the cathode active material. As an example, in some embodiments in which the cathode material slurry includes $MnO_2$, the extent of reaction between the residual aromatic compounds and the $MnO_2$ may be relatively low, so that relatively little $Mn_3O_4$ is formed. In certain embodiments, oxidation of the residual aromatic compounds in the cathode material slurry can result in the formation of inert products (e.g., carbon dioxide, water) that do not substantially interfere with the electrochemical performance of electrochemical cell 10.

In certain embodiments, the partial pressure of oxygen in the heat treatment atmosphere can be selected to provide a desired amount of oxidation of residual aromatic compounds in cathode 16 without also substantially oxidizing the binder (e.g., Kraton™ G-1651 Polymer) in cathode 16. In some embodiments, the heat treatment atmosphere can include oxygen at a partial pressure of at least about 0.1 inch Hg or 2.54 Torr (e.g., at least about 0.3 inch Hg (7.6 Torr), at least about 0.5 inch Hg (12.7 Torr), at least about one inch Hg (25.4 Torr), at least about two inches Hg (50.8 Torr), at least about three inches Hg (76.2 Torr), at least about four inches Hg (101.6 Torr), at least about five inches Hg (127 Torr), at least about six inches Hg (152.4 Torr), at least about seven inches Hg (177.8 Torr), at least about eight inches Hg (203.2 Torr), at least about nine inches Hg (228.6 Torr)), and/or at most about 10 inches Hg or 254 Torr (e.g., at most about nine inches Hg (228.6 Torr), at most about eight inches Hg (203.2 Torr), at most about seven inches Hg (177.8 Torr), at most about six inches Hg (152.4 Torr), at most about five inches Hg (127 Torr), at most about four inches Hg (101.6 Torr), at most about three inches Hg (76.2 Torr), at most about two inches Hg (50.8 Torr), at most about one inch Hg (25.4 Torr), at most about 0.5 inch Hg (12.7 Torr), at most about 0.3 inch Hg (7.6 Torr)). For example, the heat treatment atmosphere can include oxygen at a partial pressure of from about 0.1 inch Hg (2.54 Torr) to about 10 inches Hg (254 Torr) (e.g., from about 0.5 inch Hg (12.7 Torr) to about 10 inches Hg (254 Torr)). As an example, the heat treatment atmosphere can include oxygen at a partial pressure of about two inches Hg (50.8 Torr).

In some embodiments, the temperature at which cathode 16 is heat treated can be at least about 160° C. (e.g., at least about 180° C., at least about 200° C., at least about 220° C.), and/or at most about 240° C. (e.g., at most about 220° C., at most about 200° C., at most about 180° C.). For example, cathode 16 can be heat treated at a temperature of from about 160° C. to about 240° C. (e.g., about 200° C.).

In certain embodiments, cathode 16 can be heat treated for a period of at least about two hours (e.g., at least about fours hours, at least about six hours, at least about eight hours, at least about 10 hours, at least about 15 hours, at least about 20 hours, at least about 25 hours, at least about 30 hours, at least about 35 hours, at least about 40 hours, at least about 45 hours, at least about 50 hours, at least about 60 hours, at least about 70 hours), and/or at most about 75 hours (e.g., at most about 70 hours, at most about 60 hours, at most about 50 hours, at most about 45 hours, at most about 40 hours, at most about 35 hours, at most about 30 hours, at most about 25 hours, at most about 20 hours, at most about 15 hours, at most about 10 hours, at most about eight hours, at most about six hours, at most about four hours). For example, cathode 16 may be heat treated for a period of from about two hours to about 75 hours (e.g., from about four hours to about 50 hours, from about four hours to about 20 hours, about 10 hours).

In some embodiments, the temperature and/or time period for the heat treatment of cathode 16 can be selected to lower the amount of residual aromatic compounds present in the cathode material of cathode 16 to a desired level. The presence of residual aromatic compounds in the cathode material of cathode 16 can be measured, for example, using differential scanning calorimetry (DSC). Without wishing to be bound by theory, it is believed that a DSC peak (measured under nitrogen) at from about 240° C. to about 310° C. (e.g., from about 290° C. to about 310° C., about 290° C.) can be indicative of the presence of residual aromatic compounds in the cathode material. In certain embodiments, the height of a DSC peak at from about 240° C. to about 310° C. for the cathode material after heat treatment of cathode 16 can be about 30 Joules/gram or less (e.g., about 12 Joules/gram, about 11 Joules/gram, about 10 Joules/gram). For example, the peak can have a height of from about five Joules/gram to about 30 Joules/gram (e.g., from about 18 Joules/gram to about 30 Joules/gram). In some embodiments in which the peak has a height of about 30 Joules/gram or less, the cathode material can include less than about 0.1 percent by weight $Mn_3O_4$, and/or can be free of any peaks at about 18 degrees 2θ, and/or any peaks at 32.35 degrees 2 θ, and/or any peaks at 36.15 degrees 2θ.

In some embodiments, the temperature and/or time period for the heat treatment of cathode 16 can be selected to limit the oxidation of binder(s) in cathode 16. The extent of oxidation of a binder can be measured, for example, using differential scanning calorimetry. For example, a cathode material that includes oxidized Kraton™ G-1651 Polymer may have a DSC peak at from about 222° C. to about 228° C.

After cathode 16 has been heat treated in an atmosphere including oxygen at a relatively low partial pressure, cathode 16 is dried under vacuum (vacuum baked). As used herein, the drying of cathode 16 under vacuum refers to the drying of cathode 16 in an atmosphere having a pressure of less than about $10^{-2}$ Torr.

Cathode 16 can be vacuum baked using, for example, a vacuum oven, such as a Vacuum Oven Model 282A from Fischer Scientific. The vacuum baking of cathode 16 can remove water (e.g., surface moisture) from cathode 16. In some embodiments, a reduction in the amount of water in cathode 16 can result in reduced gassing by cathode 16.

In certain embodiments, cathode 16 can be vacuum baked at a temperature of at least about 160° C. (e.g., at least about 180° C., at least about 200° C., at least about 220° C.), and/or at most about 240° C. (e.g., at most about 220° C., at most about 200° C., at most about 180° C.). For example, cathode 16 can be vacuum baked at a temperature of from about 160° C. to about 240° C. (e.g., about 200° C.).

In some embodiments, cathode 16 can be vacuum baked until the cathode material of cathode 16 includes about 600 ppm of water or less (e.g., from about 400 ppm to about 600 ppm of water). In certain embodiments, cathode 16 can be vacuum baked for a period of at least about four hours (e.g., at least about 10 hours, at least about 20 hours, at least about 30 hours, at least about 40 hours), and/or at most about 50 hours (e.g., at most about 40 hours, at most about 30 hours, at most about 20 hours, at most about 10 hours). For example, cathode 16 may be vacuum baked for a period of from about four hours to about 50 hours (e.g., from about eight hours to about 12 hours, about 10 hours).

Cathodes and methods of making cathodes are described, for example, in Boczer et al., U.S. Patent Application Publication No. US 2004/0091773 A1, published on May 13, 2004.

Anode 12 can include an anode active material, usually in the form of an alkali metal (e.g., lithium, sodium, potassium) or an alkaline earth metal (e.g., calcium, magnesium). In some embodiments, anode 12 can include an alloy of an alkali or alkaline earth metal and one or more other metals. For example, anode 12 can include an alloy of an alkali metal (e.g., lithium) and an alkaline earth metal or an alloy of an alkali metal and aluminum. As an example, anode 12 can include a lithium-aluminum alloy. An anode that includes lithium can include elemental lithium, one or more lithium alloys, one or more lithium-insertion compounds (e.g., $LiC_6$, $Li_4Ti_5O_{12}$, $LiTiS_2$), or a combination thereof. Anode 12 can be used with or without a substrate. In certain embodiments, anode 12 can include both an anode active material and a binder. In such embodiments, the anode active material can include a tin-based material, a carbon-based material (e.g., carbon, graphite, an acetylenic mesophase carbon, coke), a metal oxide, and/or a lithiated metal oxide. The binder can be, for example, polyethylene, polypropylene, a styrene-butadiene rubber, or polyvinylidene fluoride (PVDF). The anode active material and binder can be mixed to form a paste which can be applied, for example, to a substrate of anode 12. Specific anode active materials that are used in a cell may be a function of, for example, the type of cell (such as primary or secondary).

The electrolytic solution or electrolyte can be in liquid, solid or gel (polymer) form. For example, the electrolyte can be a nonaqueous electrolytic solution that includes a solvent and one or more salts. The electrolyte can contain an organic solvent, such as a carbonate, an ether, an ester, a nitrile, or a phosphate. Examples of organic solvents include propylene carbonate (PC), ethylene carbonate (EC), dimethoxyethane (DME) (e.g., 1,2-dimethoxyethane), butylene carbonate (BC), dioxolane (DX), tetrahydrofuran (THF), gamma-butyrolactone, diethyl carbonate (DEC), dimethyl carbonate (DMC), ethyl methyl carbonate (EMC), dimethylsulfoxide (DMSO), methyl formiate (MF), sulfolane, methyl propionate, ethyl propionate, methyl butyrate, gamma-butyrolactone, acetonitrile, triethylphosphate, trimethylphosphate, diethyl ether, dimethyl ether, diethoxyethane, tetrahydrofuran (THF), sulfolane, or a combination (e.g., a mixture) thereof. The electrolyte can alternatively contain an inorganic solvent such as $SO_2$ or $SOCl_2$. The electrolyte also can contain one or more salts (e.g., two salts, three salts, four salts). The salt can be an alkali or alkaline earth salt such as a lithium salt, a sodium salt, a potassium salt, a calcium salt, a magnesium salt, or combinations thereof. Examples of lithium salts include lithium tetrafluoroborate, lithium hexafluoroarsenate, lithium perchlorate, lithium iodide, lithium bromide, lithium tetrachloroaluminate, $LiN(CF_3SO_2)_2$, and $LiB(C_6H_4O_2)_2$, lithium trifluoromethanesulfonate (LiTFS), lithium trifluoromethanesulfonimide (LiTFSI), lithium hexafluorophosphate ($LiPF_6$), and combinations thereof. Additional lithium salts that can be included are listed in Suzuki, U.S. Pat. No. 5,595,841, which is incorporated herein by reference in its entirety. A perchlorate salt such as lithium perchlorate can be included in the electrolyte to help suppress corrosion of aluminum or an aluminum alloy in the cell, for example in the current collector. The concentration of the salt in the electrolyte solution can range from 0.01 molar to three molar, from 0.5 molar to 1.5 molar, and in certain embodiments can be one molar. Other salts that can be included in the electrolyte are bis(oxalato)borate salts. Bis(oxalato)borate salts are described, for example, in Totir et al., U.S. Patent Application Publication No. US 2005/0202320, published on Sep. 15, 2005, and entitled "Non-Aqueous Electrochemical Cells", which is incorporated herein by reference in its entirety.

Separator 20 can be formed of any of the standard separator materials used in electrochemical cells (e.g., lithium primary or secondary cells). For example, separator 20 can be formed of polypropylene (e.g., nonwoven polypropylene or microporous polypropylene), polyethylene, polytetrafluoroethylene, a polyamide (e.g., a nylon), a polysulfone, a polyvinyl chloride, or combinations thereof. In some embodiments, separator 20 can have a thickness of from about nine microns to about 75 microns (e.g., from about nine microns to about 37 microns, from about 12 microns to about 37 microns). In certain embodiments, separator 20 can be cut into pieces of a similar size as anode 12 and cathode 16, and placed therebetween as shown in FIG. 1.

Housing 22 can be made of a metal or a metal alloy, such as nickel, nickel plated steel, stainless steel, aluminum-clad stainless steel, aluminum, or an aluminum alloy. Alternatively or additionally, housing 22 can be made of a plastic, such as polyvinyl chloride, polypropylene, a polysulfone, acrylonitrile butadiene styrene (ABS), or a polyamide.

Positive lead 18 can include stainless steel, aluminum, an aluminum alloy, nickel, titanium, or steel. Positive lead 18 can be annular in shape, and can be arranged coaxially with the cylinder of a cylindrical cell. In some embodiments, positive lead 18 can also include radial extensions in the direction of cathode 16 that can engage the current collector. An extension can be round (e.g. circular or oval), rectangular, triangular or another shape. In certain embodiments, positive lead 18 can include extensions having different shapes. Positive lead 18 and the current collector are in electrical contact. Electrical contact between positive lead 18 and the current collector can be achieved by mechanical contact. Alternatively or additionally, positive lead 18 and the current collector can be welded together.

Cap 24 can be made of, for example, aluminum, nickel, titanium, or stainless steel.

A cell (e.g., a cylindrical cell) can be prepared by, for example, rolling an anode, separator, and cathode together, and placing them in a housing. The housing (containing the anode, the cathode, and the separator) can then be filled with the electrolytic solution and subsequently hermetically sealed with, for example, a cap and annular insulating gasket.

In some embodiments, a cell (e.g., a cylindrical cell) can be prepared by spirally winding the anode and the cathode together, with a portion of the cathode current collector extending axially from one end of the roll. The portion of the current collector that extends from the roll can be free of cathode active material. To connect the current collector with an external contact, the exposed end of the current collector can be welded to a metal tab, which is in electric contact with an external battery contact. The grid can be rolled in the machine direction, the pulled direction, perpendicular to the machine direction, or perpendicular to the pulled direction. The tab can be welded to the grid to minimize the conductivity of grid and tab assembly. Alternatively, the exposed end of the current collector can be in mechanical contact (i.e. not welded) with a positive lead which is in electric contact with an external battery contact. A cell having a mechanical contact can require fewer parts and steps to manufacture than a cell with a welded contact. In certain embodiments, the effectiveness of the mechanical contact can be enhanced by bending the exposed grid towards the center of the roll to create a dome or crown, with the highest point of the crown over the axis of the roll, corresponding to the center of a cylindrical cell. In the crown configuration, the grid can have a denser arrangement of strands than in the non-shaped form. A crown can be orderly folded and the dimensions of a crown can be precisely controlled.

Methods for assembling electrochemical cells are described, for example, in Moses, U.S. Pat. No. 4,279,972; Moses et al., U.S. Pat. No. 4,401,735; and Kearney et al., U.S. Pat. No. 4,526,846, all of which are incorporated herein by reference.

Figure 2:
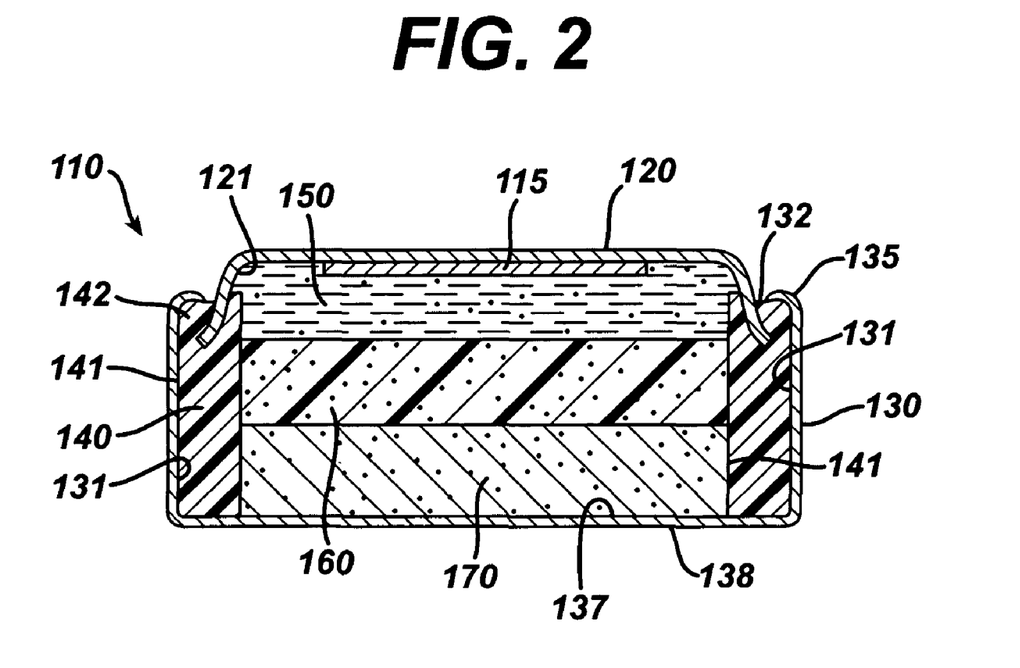
FIG. 2 is a side cross-sectional view of an embodiment of an electrochemical cell.

Other configurations of an electrochemical cell can also be used, including, for example, the button or coin cell configuration, the prismatic cell configuration, the rigid laminar cell configuration, and the flexible pouch, envelope or bag cell configuration. For example, FIG. 2 shows a button or coin cell 110 including a disk-shaped cylindrical housing 130, and a cathode 170 and an anode 150 that are separated from each other by a separator sheet 160. Housing 130 is formed having an open end 132 and a closed end 138. In some embodiments, an electrical insulating member 140 (e.g., a cylindrical body having a hollow core) can be inserted into housing 130 so that the outside surface 141 of insulating member 140 abuts and lines the inside surface 131 of housing 130. In certain embodiments, inside surface 131 of housing 130 can be coated with a polymeric material that solidifies into insulator 140, which can abut inside surface 131 of housing 130. Insulator 140 can be formed from one or more thermally stable insulating materials, such as nylon and/or polypropylene.

To form cell 110, insulator 140 can be added into and/or formed within housing 130. Then, cathode 170 can be applied as a layer or a pressed disk abutting the inside surface 137 of closed end 138 of housing 130. Separator sheet 160 can then be placed overlying cathode 170. A non-aqueous electrolyte can be added so that electrolyte fully penetrates through separator sheet 160 and cathode 170. A layer of anode 150 can be applied to separator sheet 160, and an anode cover 120 (e.g., formed of stainless steel), can be inserted into open end 132 of housing 130. In some embodiments, an anode current collector 115 can be welded to the inside surface 121 of anode cover 120. Peripheral edge 135 of housing 130 can be crimped over the exposed insulator edge 142 of insulating member 140, thereby closing housing 130 and tightly sealing the cell contents therein. Anode cover 120 can function as the negative terminal of cell 110, and housing 130 at closed end 138 can function as the positive terminal of cell 110.

While electrochemical cells of different configurations have been described, electrochemical cells can also be of different voltages (e.g., 1.5 V, 3.0 V, 4.0 V).

Electrochemical cells are described, for example, in Berkowitz et al., U.S. patent application Ser. No. 10/675,512, filed on Sep. 30, 2003, and entitled "Batteries"; Berkowitz et al., U.S. Patent Application Publication No. US 2005/0112467 A1, published on May 26, 2005; Totir et al., U.S. patent application No. 10/800,905, filed on Mar. 15, 2004, and entitled "Non-Aqueous Electrochemical Cells"; and Anglin et al., U.S. Pat. No. 6,841,302, all of which are incorporated herein by reference.

While electrochemical cell 10 in FIG. 1 is a primary cell, in some embodiments a secondary cell can have a cathode that includes the above-described cathode active material. Primary electrochemical cells are meant to be discharged (e.g., to exhaustion) only once, and then discarded. Primary cells are not intended to be recharged. Primary cells are described, for example, in David Linden, *Handbook of Batteries* (McGraw-Hill, 2d ed. 1995). Secondary electrochemical cells can be recharged for many times (e.g., more than fifty times, more than a hundred times, or more). In some cases, secondary cells can include relatively robust separators, such as those having many layers and/or that are relatively thick. Secondary cells can also be designed to accommodate for changes, such as swelling, that can occur in the cells. Secondary cells are described, for example, in Falk & Salkind, "Alkaline Storage Batteries", John Wiley & Sons, Inc. 1969, and in DeVirloy et al., U.S. Pat. No. 345,124, both of which are incorporated herein by reference.

While certain embodiments have been described, other embodiments are possible.

As an example, while manganese oxide cathode active materials have been described, in some embodiments, a cathode can include one or more other types of cathode active materials. For example, a cathode can include nickel oxyhydroxide (NiOOH), carbon monofluoride or vanadium pentoxide.

As another example, while heat treatment and vacuum baking have been described, in certain embodiments, a cathode can just be vacuum baked. In some embodiments, a cathode can be vacuum baked at a temperature of less than about 200° C. (e.g., less than about 180° C., less than about 160° C.). For example, a cathode may be vacuum baked at about 150° C.

As an additional example, in some embodiments, a cathode can be heat treated in air and then vacuum baked. In certain embodiments, a cathode can be heat treated in air at a temperature of more than about 100° C. (e.g., more than about 110° C., more than about 130° C., more than about 150° C., more than about 170° C., more than about 190° C.), and/or less than about 200° C. (e.g., less than about 190° C., less than about 170° C., less than about 150° C., less than about 130° C., less than about 110° C.).

As a further example, in some embodiments, a cathode can be heat treated in a vacuum. For example, the cathode may be heat treated in an atmosphere having a pressure of less than about $10^{-2}$ Torr. In certain embodiments, a cathode can be heat treated in a vacuum oven containing one or more compositions that release oxygen into the vacuum oven (e.g., upon being heated), such as potassium chlorate ($KClO_3$) and potassium permanganate ($KMnO_4$). In certain embodiments, a cathode can be heat-treated in a vacuum oven containing a porous sponge that can release oxygen into the vacuum oven.

As another example, while heat treatment of a cathode in an atmosphere including oxygen at a relatively low partial pressure has been described, in some embodiments, a cathode can be heat treated in an atmosphere that includes one or more other gases (either as an alternative to, or in addition to, oxygen). For example, a cathode may be heat treated in an atmosphere that includes one or more oxidizing gases, such as nitrogen dioxide ($NO_2$), sulfur dioxide ($SO_2$), and/or ozone, either in addition to or as an alternative to oxygen. In some embodiments, a cathode may be heat treated in an atmosphere including nitrogen and/or one or more inert gases (e.g., helium, neon, argon, krypton, xenon, radon). The nitrogen and/or inert gas(es) can be mixed with, for example, oxygen and/or air. The oxygen in the atmosphere can be at a partial pressure of from about 0.1 inch Hg to about 10 inches Hg.

As an additional example, while the heat treatment and vacuum baking of one cathode has been described, in some embodiments, multiple (e.g., two, three, four, five, 10, 15, 25, 50, 100, 150, 200, 250, 300) cathodes can be heat treated and/or vacuum baked at the same time. Heat treating and/or vacuum baking multiple cathodes simultaneously can, for example, increase the efficiency of a cathode manufacturing process. In certain embodiments, a long strip of a current collector coated with a cathode material can be heat treated and vacuum baked and then can be cut into individual cathodes.

As a further example, in some embodiments, a cathode can include a $CO_2$ absorption agent. $CO_2$ absorption agents are described, for example, in Bowden et al., U.S. patent application Ser. No. 11/096,514, filed on Apr. 1, 2005, and entitled "Battery Cathodes".

All references, such as patent applications, publications, and patents, referred to herein are incorporated by reference in their entirety.

Other embodiments are in the claims.

What is claimed is:

1. A method of making a battery, the method comprising:
   (a) heating at least one cathode comprising a current collector, a cathode active material that is reduced during operation of the battery, and a polymeric binder at a temperature of between 160° C. and 240° C. in an atmosphere in step (a) comprising oxygen at a partial pressure of from 0.1 inch Hg to 4 inches Hg to oxidize residual aromatic compounds or hydrocarbons in the cathode without substantially oxidizing the binder;
   (b) after step (a), heating the at least one cathode in a vacuum to remove water from the cathode;
   (c) adding the at least one cathode into a housing;
   (d) adding a separator into the housing; and
   (e) adding an anode comprising an anode active material that is oxidized during operation of the battery into the housing.

2. The method of claim 1, wherein the atmosphere comprises oxygen at a partial pressure of from 0.1 inch Hg to 2 inches Hg.

3. The method of claim 1, wherein step (b) comprises heating the at least one cathode at a temperature of at least 160° C.

4. The method of claim 1, wherein step (b) comprises heating the at least one cathode at a temperature of from 160° C. to 240° C.

5. The method of claim 1, wherein the cathode active material comprises iron disulfide.

6. The method of claim 1, wherein the cathode active material comprises manganese dioxide.

7. The method of claim 1, wherein the binder comprises a styrenic block copolymer.

8. The method of claim 7, wherein the binder comprises styrene-ethylene/butylene-styrene.

9. The method of claim 1, wherein step (b) comprises heating the at least one cathode in a vacuum until the cathode material includes 600 ppm of water or less.

10. The method of claim 1, wherein step (b) comprises heating the at least one cathode in a vacuum until the cathode material includes from 400 ppm to 600 ppm of water.

11. The method of claim 1, wherein step (b) comprises heating the at least one cathode in a vacuum for at least four hours.

12. The method of claim 1, wherein step (a) comprises heating the at least one cathode until the cathode material has a differential scanning calorimetry peak at from 290° C. to 300° C. with a height of 30 Joules/gram or less.

13. The method of claim 12, wherein after step (b), the cathode material comprises less than 0.1 percent by weight $Mn_3O_4$.

14. The method of claim 13, wherein the peak has a height of from 5 Joules/gram to 30 Joules/gram.

15. The method of claim 1, wherein the battery is a primary battery.

16. The method of claim 1, wherein the anode active material comprises lithium.

17. The method of claim 1, wherein in step (a) the atmosphere further comprises an inert gas in a mixture with the oxygen.

18. The method of claim 1, wherein in step (a) the atmosphere further comprises nitrogen in a mixture with the oxygen.

\* \* \* \* \*